United States Patent
Zhou

(10) Patent No.: US 11,907,216 B2
(45) Date of Patent: Feb. 20, 2024

(54) MULTI-LANGUAGE FUSION QUERY METHOD AND MULTI-MODEL DATABASE SYSTEM

(71) Applicant: HUAWEI TECHNOLOGIES CO., LTD., Guangdong (CN)

(72) Inventor: Minqi Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 17/525,792

(22) Filed: Nov. 12, 2021

(65) Prior Publication Data
US 2022/0075780 A1    Mar. 10, 2022

Related U.S. Application Data

(63) Continuation of application No. PCT/CN2020/090393, filed on May 15, 2020.

(30) Foreign Application Priority Data

May 15, 2019 (CN) .......................... 201910403857.0

(51) Int. Cl.
G06F 16/2453 (2019.01)
G06F 16/22 (2019.01)

(52) U.S. Cl.
CPC .... G06F 16/24542 (2019.01); G06F 16/2282 (2019.01)

(58) Field of Classification Search
CPC ................. G06F 16/24542; G06F 16/2282
See application file for complete search history.

(56) References Cited

U.S. PATENT DOCUMENTS

| 11,321,330 | B1 * | 5/2022 | Pandis ............... G06F 16/2471 |
| 2016/0224557 | A1 | 8/2016 | Chi et al. |
| 2016/0253380 | A1 | 9/2016 | Nguyen et al. |
| 2017/0212931 | A1 | 7/2017 | Chen et al. |

(Continued)

FOREIGN PATENT DOCUMENTS

| CN | 101705810 A | 5/2010 |
| CN | 104699720 A | 6/2015 |

(Continued)

OTHER PUBLICATIONS

Shu Chen et al., "Optimizations of Graph Queries in Relational Databases", Jan. 16, 2015, total:66pages.

*Primary Examiner* — Dangelino N Gortayo
(74) *Attorney, Agent, or Firm* — HUAWEI TECHNOLOGIES CO., LTD.

(57) ABSTRACT

A fusion query method and a multi-model database (MMDB) framework are provided, to add a capability of extending a foreign engine in a relational database engine and manage metadata of the foreign extensible engine by using a user table. This minimizes intrusion to the relational database engine, and implements dynamic loading and unloading of the foreign engine during runtime. Therefore, a maintenance interface and uniform data access to a multi-model database such as a relational database, a graph database, or a time series database are provided for a user, so that learning and use costs of operation and maintenance personnel and application development personnel are reduced, and security of data use is improved.

14 Claims, 8 Drawing Sheets

(56) References Cited

U.S. PATENT DOCUMENTS

| | | | | |
|---|---|---|---|---|
| 2017/0364539 A1* | 12/2017 | Jacob | ................ | G06F 16/24547 |
| 2019/0179820 A1* | 6/2019 | El Kaed | .............. | G06F 16/2474 |
| 2019/0196890 A1* | 6/2019 | Bucchi | ................. | G06F 16/951 |
| 2020/0036687 A1* | 1/2020 | May | ...................... | H04W 12/02 |
| 2020/0104400 A1* | 4/2020 | Obert | ................. | G06F 16/2471 |
| 2020/0272664 A1* | 8/2020 | Aggour | .............. | G06F 16/9038 |

FOREIGN PATENT DOCUMENTS

| | | |
|---|---|---|
| CN | 106844545 A | 6/2017 |
| CN | 107273422 A | 10/2017 |
| CN | 109145025 A | 1/2019 |
| CN | 109241054 A | 1/2019 |

\* cited by examiner

MULTI-LANGUAGE FUSION QUERY METHOD AND MULTI-MODEL DATABASE SYSTEM

CROSS-REFERENCE TO RELATED APPLICATIONS

This application is a continuation of International Application No. PCT/CN2020/090393, filed on May 15, 2020, which claims priority to Chinese Patent Application No. 201910403857.0, filed on May 15, 2019. The disclosures of the aforementioned applications are hereby incorporated by reference in their entireties.

TECHNICAL FIELD

This application relates to the field of databases, and more specifically, to a fusion query method and a multi-model database system.

BACKGROUND

Database systems are cores of many application systems. A conventional database system is a relational database system constructed based on a relational model, and is specially used to process structured data. In brief, the relational model is a two-dimensional table model, and a relational database is a data organization including two-dimensional tables and associations among the two-dimensional tables. With the development of internet and artificial intelligence, based on the structured data, semi-structured data such as data in JSON format and XML format, and unstructured data such as audio and video data and text data are gradually derived. Typical applications of the structured data include a bank transaction and the like. The semi-structured data is used on a large scale in scenarios such as user profiling, log collection of an internet of things device, and clickstream analysis of an application. The unstructured data corresponds to a huge quantity of services such as images, videos, and document processing. To meet management requirements of various types of data, many non-relational dedicated database systems have been developed, including an XML database, a graph database, a time series database, a document database, a key-value (KV) database, and the like.

Because a current application system becomes more complex, in many scenarios, an application needs to use a plurality of types of data at the same time, for example, relational data, a graph, and time series data, and a database also needs to provide a corresponding computing capability, for example, graph traversal, graph analysis, or time series computation. A "safe city" scenario is used as an example. When a crime occurs, the police not only needs to query basic information, a behavior record, and the like of a criminal suspect by using the relational database, but also needs to analyze and query relationships of the suspect, such as a peer, a roommate, a call record, and a social relationship by using a graph execution engine and a graph database, to search out a person who has direct or indirect contact with the suspect. However, storage and management services of different types of data are usually provided by different types of databases. Consequently, a user needs to separately use a plurality of database systems, a use process is tedious, a plurality of sets of independent database systems lead to complex system management and maintenance, and data needs to be imported and exported among the databases. This increases a risk of data exposure, and hardly ensures data consistency.

To resolve the foregoing problems, in the conventional technology, based on the relational database, a specific data type such as a JSON type or a Spatial type is added in a user-defined type (UDT) manner, and a computing capability for the data type is added in a user-defined function (UDF) manner. Compared with construction of a new database system, although a processing capability for a new data type can be relatively rapidly extended according to the solution in the conventional technology, only some data types with relatively small data lengths can be extended due to a limitation imposed by a table structure of the original relational database. However, it is difficult to extend a data type with a relatively large data length, for example, graph data. If processing of the graph data needs to be supported, a kernel of the original relational database needs to be significantly reconstructed. Consequently, a development cycle is long, and a new extensible execution engine cannot be extended and unloaded during runtime.

SUMMARY

This application provides a fusion query method and a multi-model database management system, to provide a user with a maintenance interface and uniform data access to a multi-model database such as a relational database, a graph database, or a time series database, so that learning and use costs of operation and maintenance personnel and application development personnel are reduced, and security of data use is improved.

According to a first aspect, an embodiment of this application provides a database system, including: a main execution engine, one or more extensible execution engines, and an adapter, where the main execution engine is configured to: receive a fusion query from a client, where the fusion query includes a first type of query and a second type of query; and process the first type of query to obtain a first processing result, and pass the second type of query to the adapter by using a first interface; the adapter is configured to: determine, based on metadata of the one or more extensible execution engines, a first extensible execution engine configured to process the second type of query, and a second interface corresponding to the first extensible execution engine; and pass the second type of query to the first extensible execution engine by using the second interface; the first extensible execution engine is configured to: process the second type of query to obtain a second processing result, and return the second processing result to the main execution engine by using the adapter; and the main execution engine is further configured to: generate a query result based on the first processing result and the second processing result, and return the query result to the client.

In a possible implementation, the first extensible execution engine converts the second type of query into the first type of query, and sends the converted query to the main execution engine; and the main execution engine processes the converted query to obtain the query result.

In a possible implementation, the first type of query is an SQL query, and the second type of query is a graph query, a time series query, or an approximate query.

In a possible implementation, the second type of query is defined by a user-defined function (UDF).

In a possible implementation, the first interface includes at least one hook function; and the at least one hook function is associated with the UDF.

In a possible implementation, the metadata includes information about an extensible execution engine supported by the multi-model database management system.

In a possible implementation, the information about the extensible execution engine includes: a type of the extensible execution engine, an address of a server on which one or more instances of the extensible execution engine are located, and interface information corresponding to the extensible execution engine. The adapter is specifically configured to: query the metadata to determine a first engine instance of the first extensible execution engine and an interface corresponding to the first engine instance, and pass, by using the interface corresponding to the first engine instance, the second type of query to the first engine instance for processing.

In a possible implementation, the metadata is stored in a user table of the multi-model database management system.

In a possible implementation, the main execution engine is a structured query language (SQL) engine, and the one or more extensible execution engines include at least one of a graph execution engine, a time series engine, or an approximate query engine.

In a possible implementation, the first type of query is a structured query statement, the second type of query is a graph query statement, and the first extensible execution engine is a graph execution engine.

According to a second aspect, an embodiment of this application provides a fusion query method, which is applicable to a multi-model database management system. The method includes: A database manager system receives a fusion query submitted by a client, where the fusion query includes a first type of query and a second type of query; processes, by using a main execution engine, the first type of query to obtain a first processing result; determines, based on metadata, a first extensible execution engine configured to process the second type of query, and an interface corresponding to the first extensible execution engine; and passes the second type of query to the first extensible execution engine by using the interface; the first extensible execution engine processes the second type of query to obtain a second processing result; and the main execution engine receives the second processing result by using the interface, generates a query result based on the first processing result and the second processing result, and returns the query result to the client.

In a possible implementation, the first extensible execution engine converts the second type of query into the first type of query, and sends the converted query to the main execution engine; and the main execution engine processes the converted query to obtain the query result.

According to a third aspect, an embodiment of this application provides a database server, including one or more functional units configured to perform the method according to the first aspect or any one implementation of the first aspect. The functional unit may be implemented by using a software module, or may be implemented by using hardware such as a processor, or may be implemented by combining a software and necessary hardware.

According to a fourth aspect, an embodiment of this application provides a database server, including a memory, a processor, and a computer program stored on the memory, where the processor executes the computer program to implement a function of the multi-model database management system described in the first aspect or any implementation of the first aspect.

According to a fifth aspect, an embodiment of this application provides a computer-readable storage medium. The computer-readable storage medium stores a computer program (instructions). When the program (instructions) is executed by a processor, a step of the method according to the first aspect or any one implementation of the first aspect is implemented.

BRIEF DESCRIPTION OF DRAWINGS

To describe the technical solutions in the embodiments of this application more clearly, the following briefly describes the accompanying drawings required for describing the embodiments in this application.

DESCRIPTION OF EMBODIMENTS

The following describes the technical solutions in the embodiments of this application with reference to the accompanying drawings in the embodiments of this application. It is clearly that the described embodiments are merely some rather than all of the embodiments of this application.

"A plurality of" in the embodiments of this application refers to two or more than two. In addition, it should be understood that in the descriptions of this application, terms such as "first" and "second" are merely used for distinguishing and description, but should not be understood as indicating or implying relative importance, or should not be understood as indicating or implying a sequence.

Figure 1:
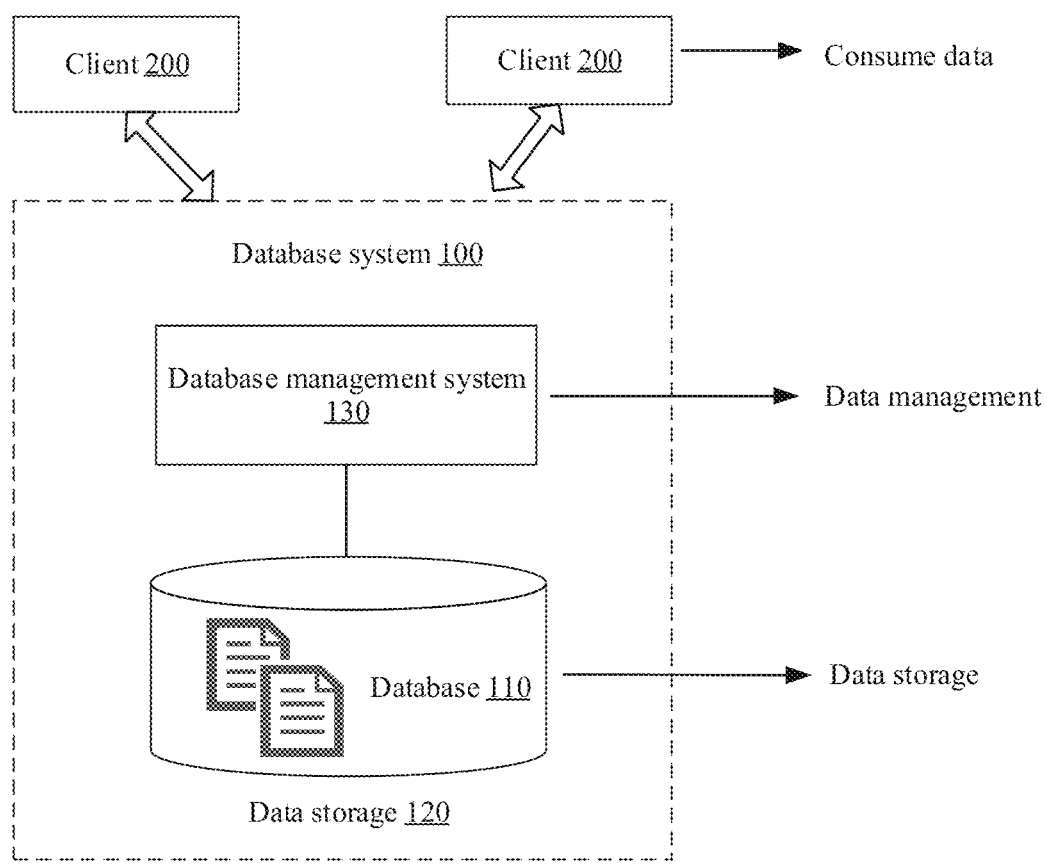
FIG. 1 is a schematic diagram of an architecture of a database system according to an embodiment of this application.

The method provided in the embodiments of this application may be applied to a database system. FIG. 1 shows a typical logical architecture of a database system. According to FIG. 1, a database system 100 includes a database 110 and a database management system (DBMS) 130.

The database 110 is an organized data set stored in a data storage 120, that is, an associated data set organized, stored, and used based on a particular data model. Based on different data models used for organizing data, the data may be divided into a plurality of types, for example, relational data, graph data, and time series data. The relational data is data modeled by using a relational model, and is usually represented as a table, where a row in the table represents a set of associated values of an object or entity. The graph data, "graph" for short, is used to represent a relationship, for example, a social relationship, between objects or entities. The time series data, time series data for short, is a data column recorded and indexed in a time sequence, and is used to describe status transition information of an object in a time dimension.

The database management system 130 is a core of the database system, and is system software used to organize, store, and maintain data. The client 200 may access the database 110 by using the database management system 130, and a database administrator also maintains the database by using the database management system. The database management system 130 provides various functions for the client 200 to establish, modify, and query the database, where the client 200 may be an application or user equipment. The functions provided by the database management system 130 may include but are not limited to the following items: (1) a data definition function: the database management system 130 provides a data definition language (DDL) to define a structure of the database 110, where the DDL is used to depict a database framework, and may be stored in a data dictionary; (2) a data access function: the database management system 130 provides a data manipulation language (DML) to implement basic access operations on the database 110, for example, retrieval, insertion, modification, and deletion; (3) a database operation management function: the database management system 130 provides a data control function to effectively control and manage operation of the database 110, to ensure correct and effective data; (4) database establishment and maintenance functions, including functions such as loading of initial data of the database, dump, restoration, and reorganization of the database, and monitoring and analysis of system performance; and (5) transmission of the database: the database management system provides transmission of processed data, to implement communication between the client and the database management system, and the database management system usually coordinates with an operating system to complete the transmission of the processed data.

The data storage 120 includes but is not limited to a solid state disk (SSD), a disk array, a cloud storage, or another type of non-transitory computer-readable storage medium. A person skilled in the art may understand that the database system may include components more or less than those shown in FIG. 1, or include components different from those shown in FIG. 1. FIG. 1 merely show components more related to implementations disclosed in the embodiments of the present invention.

Embodiments of this application provide a multi-model database (MMDB) management system capable of supporting a plurality of types of data models (for example, a relational data model, a graph data model, a key-value data model, and a time series data model) at the same time, and a multi-language fusion query method based on the multi-model database management system. The method and the apparatus are based on a same inventive concept. Because problem-resolving principles of the method and the apparatus are similar, apparatus implementation and method implementation may be mutually referenced.

Figure 2:
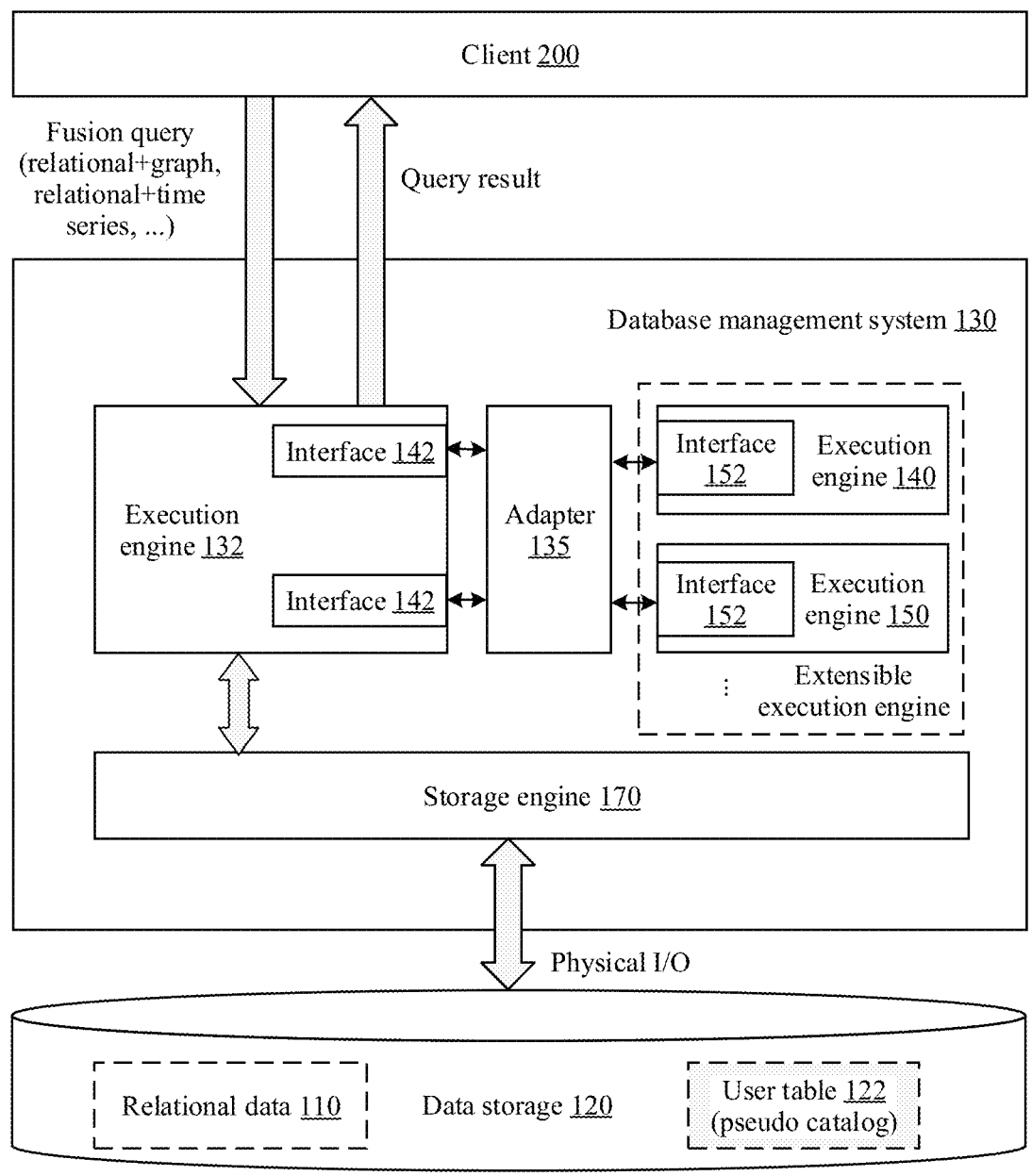
FIG. 2 is a schematic diagram of a structure of a database management system according to an embodiment of this application.

FIG. 2 shows an example of a multi-model database management system according to an embodiment of this application. According to FIG. 2, a database management system 130 includes: a storage engine 170, an adapter 135, and several execution engines (for example, a main execution engine 132 and extensible execution engines 140 and 150 shown in FIG. 2). The execution engines 132, 140, and 150 are different types of execution engines respectively. Each type of execution engine supports one type of query language, for example, a relational database engine ("relational engine" for short) supports a relational data model, to process a relational query, for example, a structured query language (SQL) query; a graph execution engine is configured to process a graph query, for example, a Gremlin query; and a time series engine is configured to process a time series query. A main function of an execution engine is to generate a corresponding execution plan based on a query submitted by a client 200, and perform a data operation based on the execution plan to generate a query result. For a relational database management system, execution engines mainly include an SQL engine and an execution engine. The SQL engine mainly parses an SQL query, rewrites the query, and generates an execution plan; and the execution engine includes an operator and an execution environment related to the operator. Common operators include scan, hash join, aggregate, and the like. The execution environment mainly includes an execution framework and a resource manager.

The storage engine 170 is responsible for providing, on top of a file system, the execution engines with interfaces for accessing data, and is responsible for providing index management, and managing data such as a cache, a transaction, and a log during runtime. For example, the storage engine 170 may write an execution result of the execute 132 into the data store 120 by using physical I/O.

Figure 3:
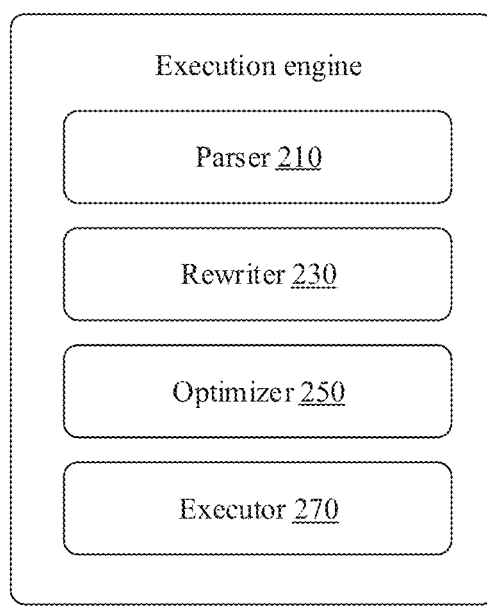
FIG. 3 is a schematic diagram of an execution engine according to an embodiment of this application.

In an embodiment, as shown in FIG. 3, one execution engine includes a parser 210, a rewriter 230, an optimizer 250, and an executor 270. The parser 210 is configured to perform lexical analysis, syntax analysis, and semantic analysis on an input query statement, and output a query parse tree. The rewriter 230 is configured to convert a query into a format that is easy to optimize, for example, rewrite a query statement in an operation aggregation manner, a predicate conversion manner, or the like. The optimizer 250 is configured to select an optimal execution path based on query cost estimation, according to a rule, based on machine learning, or the like, to generate an execution plan. The executor 270 is configured to read data by using the storage engine, process the data based on the execution plan to obtain a processing result, and return the processing result to the client.

In the database management system 130 in this embodiment of this application, other execution engines such as the execution engines 140 and 150 are further extended based on the main execution engine 132. Original data is always stored as relational data, and only one copy of data is stored. In a query execution process, the main execution engine 132 may dynamically invoke the extensible execution engines to perform specific processing, to support a fusion query of a plurality of query languages, thereby avoiding data import and export between different database systems, and improving system security. It may be understood that, the extensible execution engines 140 and 150 are execution engines different from the main execution engine 132. For example, the main execution engine 132 may be a relational execution engine, the extensible execution engine 140 is a graph engine, and the extensible execution engine 150 is a time series engine.

Refer to FIG. 2. The database management system 130 receives a query from the client 200, passes the query to the main execution engine 132 for processing, and returns a processing result to the client 200. In an embodiment, the query initiated by the client 200 is a fusion query, that is, an extensible query statement including a plurality of query languages. An example of the fusion query is given below:

with suspects (cid) as Gremlin('
   (g.v( ).has('cid1', '11111111111').
     outE('flight'; 'CA1315').has('time1,' '2016/7/1').
     outV( ).
     inE('call').has('time1', gt('2016/6/24')).count( ).gt
       (3)')
select photo, phone #, wechatid
from suspects s, citizen c
where c.id=s.id The foregoing query statement is a fusion query statement including both an SQL and a graph query, where the bold and italic part is a graph query statement, and the part beginning with "select" is an SQL query statement.

Another example of the fusion query is as follows:
with crossing_traffic_flow (cno int, direction char,
   agg_traffic int) as
   Timeseries('
     select cno, direction, sum(laneout)-sum(lanein)
     from traffic_flow
     groupby laneid, timestamp, direction, cno')
select crossing. add, traffic.cno, sum(laneout)-sum(lanein)
from crossing, ccrossing_traffic_flow traffic
where crossing.cno=traffic.cno This is a fusion query including a time series and an SQL, where the bold and italic part is a graph query statement, and the part beginning with "select" is an SQL query statement.

A conventional database management system can support only a single type of query, but cannot support a fusion query. In the database management system 130 in this embodiment of this application, a foreign execution engine may be dynamically extended during runtime, to support a fusion query including a plurality of types of query languages. Specifically, after receiving the fusion query, the database management system 130 identifies a first type of query (for example, an SQL query) and a second type of query (for example, a graph query) included in the fusion query, passes the first type of query to the main execution engine 132 for processing, and passes the second type of query to the adapter 135 by using one or more pre-configured interfaces, for example, an interface 142 integrated in the main execution engine 132. The adapter 135 is a bridge between the main execution engine 132 and the extensible execution engines 140 and 150.

Metadata (pseudo catalog) 122 is configured to store information about the extensible execution engines, and the metadata 122 includes but is not limited to one or more pieces of the following information: a type of an extensible execution engine currently available to a system, an ID of the extensible execution engine, an address of a server on which an instance of the extensible execution engine is located, interface information of the extensible execution engine, or the like. For example, the pseudo catalog may include a mapping between the type of the extensible execution engine and the address of the server on which the foreign extensible engine is located, and a mapping between the type of the extensible execution engine and the interface of the extensible execution engine. In the case of multi-instance deployment for the extensible execution engine, that is, when a plurality of instances of a same extensible execution engine are distributed on a plurality of computing nodes, the pseudo catalog further includes mappings between the type of the foreign extensible engine and the instances of the foreign extensible engine. In an embodiment, the database management system may store the foregoing mappings in a form of one or more user tables, so that a kernel of the main execution engine 132 is less modified.

In an embodiment, the adapter 135 determines, based on the information recorded by the pseudo catalog 122, the extensible execution engine 140 configured to process the second type of query and an interface corresponding to the extensible execution engine 140, and passes, by using the interface, the second type of query or parameters of the second type of query to the extensible execution engine 140 for processing. The extensible execution engine 140 processes the second type of query to obtain a processing result, and feeds back the processing result to the main execution engine 132 by using the adapter. It may be understood that, when processing the second type of query, the extensible execution engine 140 may alternatively return an intermediate result to the main execution engine 132 by using the adapter 135, and the main execution engine 132 may perform query processing based on the intermediate result returned by the extensible execution engine 140. In other words, when processing the first type of query, the main execution engine 132 may refer to the intermediate result of processing the second type of query by the extensible execution engine 140.

In an embodiment, the adapter 135 includes a common envelope wrapper and a foreign engine wrapper. The common envelope wrapper is configured to initialize, start, and terminate the extensible execution engine, and to implement heartbeat, handshake, exception handling, and the like between the extensible execution engine and the main execution engine. The foreign engine wrapper provides some hook functions for a function execution process, to pass information such as query parameters to the extensible execution engine, and returns, at a processing stage of each component, such as the parser, the rewriter, the optimizer, or the executor, of the extensible execution engine, a result to the main execution engine for corresponding processing.

Figure 4:
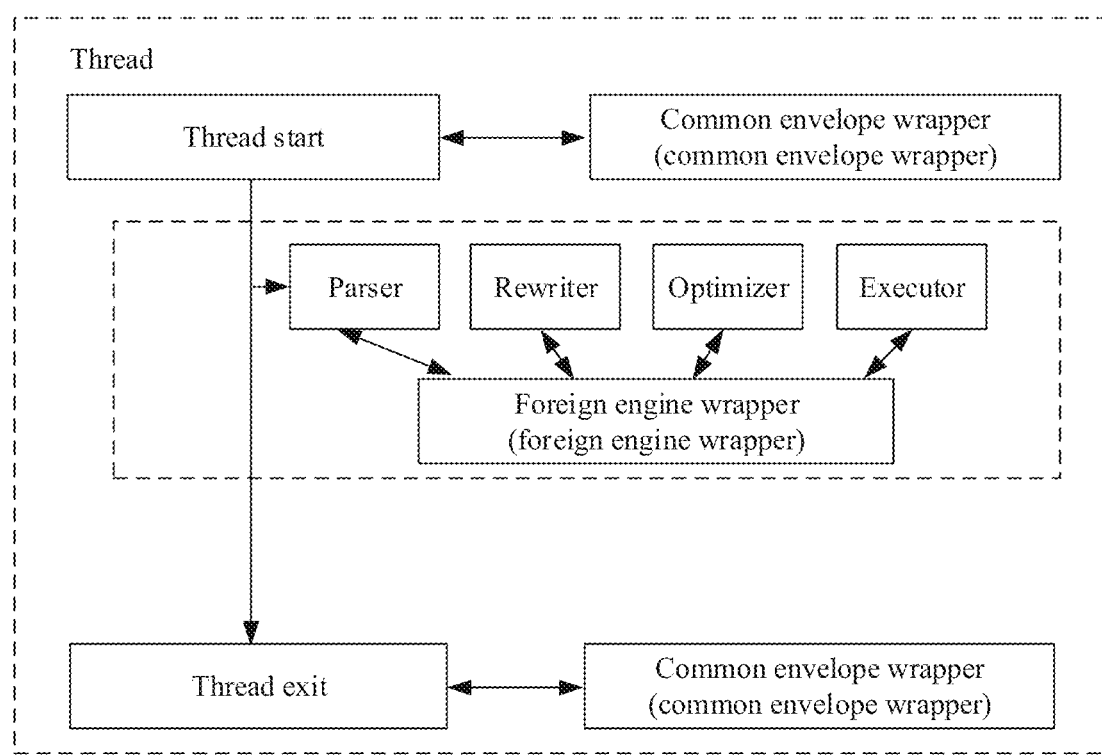
FIG. 4 is a schematic diagram of an operating process of a database management system according to an embodiment of this application.

Specifically, in an embodiment, as shown in FIG. 4, at a thread start stage (InitPostgres) of the main execution engine 132, the common envelope wrapper is invoked to perform an operation such as initialization on the pseudo catalog in a system table. At each stage of processing a query by the main execution engine 132, for example, parsing, rewriting, optimization, or execution, the hook functions are added to implement interaction between the main execution engine 132 and the extensible execution engine. For example, the hook functions may be registered for all of the main execution engine 132 and the extensible execution engines 140 and 150, and each hook function is invoked under a specific condition or event, thereby implementing a corresponding function, for example, message passing. For example, one or more hook functions may be registered for the main execution engine 132. When processing a query, the main execution engine 132 invokes a registered hook function. The hook function triggers the adapter 335 to determine a specific extensible execution engine or an instance of the extensible execution engine, determine a related interface, and then pass information to the extensible execution engine by using the corresponding interface, for example, pass information about the second type of query to the extensible execution engine. Some hook functions may also be registered for the extensible execution engine. When processing the second type of query, for example, after the graph query is converted into the SQL query through parsing, rewriting, and optimization of the graph query, the extensible execution engine invokes a hook function, to return the graph query converted into the SQL query to the main execution engine 132 by using the adapter 135 and an interface corresponding to the main execution engine 132, and the main execution engine 132 continues to process the graph query converted into the SQL query to obtain the query result. At a thread end stage, the common envelope wrapper is invoked again to release resources and clear the cache.

Figure 5:
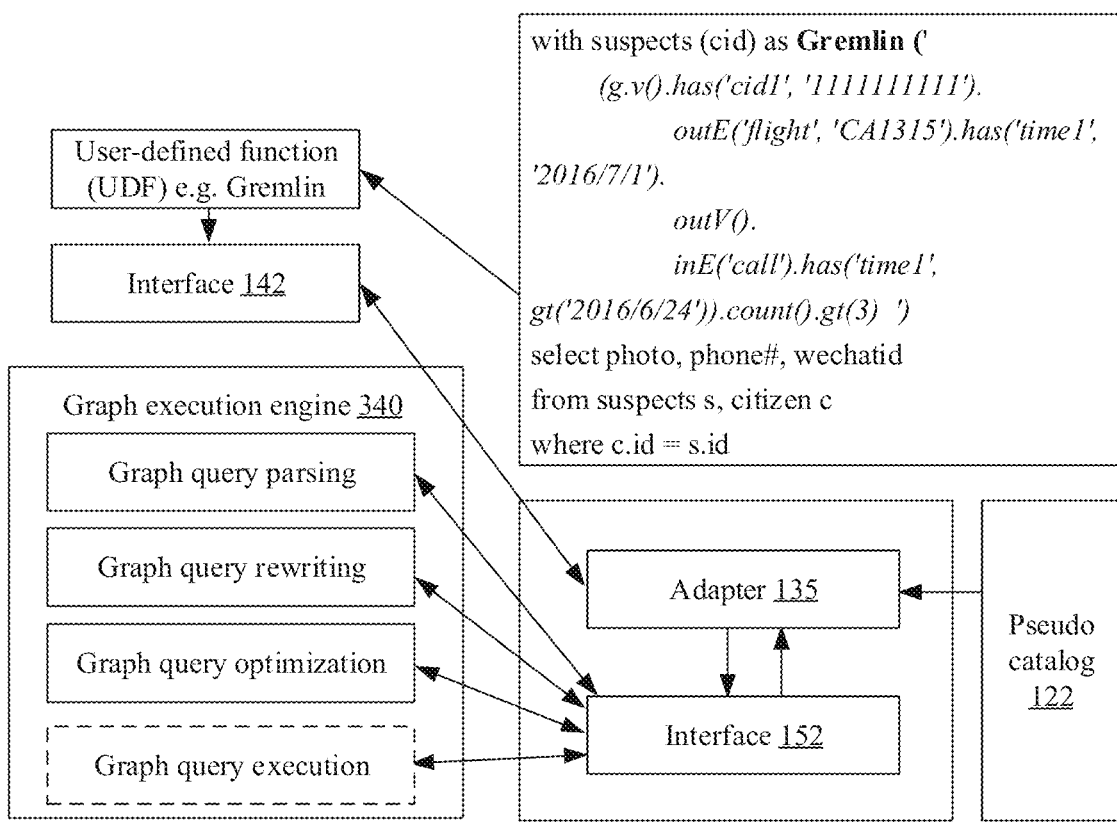
FIG. 5 is a schematic diagram of an operating process of a database management system according to an embodiment of this application.

FIG. 5 shows a process in which the database management system 130 processes the fusion query statement including the SQL and the graph query. According to FIG. 5, the database management system 130 may define a user-defined function (UDF), an input parameter of the UDF is a graph query statement supported by the graph execution engine, and a return type is a table result set of a plurality of records. The graph query in the fusion query may be considered as the UDF. The interface 142 is invoked by using the UDF to pass the graph query statement to the adapter 135, the adapter 135 determines an interface 152 corresponding to a graph execution engine 340 based on metadata of extensible execution engines recorded by the pseudo catalog 122, and then passes, by invoking the interface 152, the graph query statement to the graph execution engine 340 for processing.

In an embodiment, the graph execution engine 340 sequentially performs operations such as parsing, rewriting, optimization, and execution on the graph query statement to obtain the query result. Further, the graph execution engine 340 may return the query result to the main execution engine 132 by using the adapter 135.

In another embodiment, at each stage of processing the graph query, the graph execution engine 340 may alternatively return an intermediate result to the main execution engine 132 by using the adapter 135. For example, the graph execution engine 340 may convert the graph query into the SQL query through operations such as parsing and rewriting, and then pass the converted SQL query to the main execution engine (relational execution engine) by using the adapter 135, so that the relational execution engine further processes the converted SQL query to obtain a processing result.

A person skilled in the art may understand that, the database management system 130 may include fewer or more components than those shown in FIG. 2, or may include components different from those shown in FIG. 2. FIG. 2 merely shows components more related to implementations disclosed in the embodiments of the present invention. For example, the extensible execution engines included in the database management system 130 include but are not limited to the two extensible execution engines shown in FIG. 2, and may be one or more than two extensible execution engines.

Figure 6:
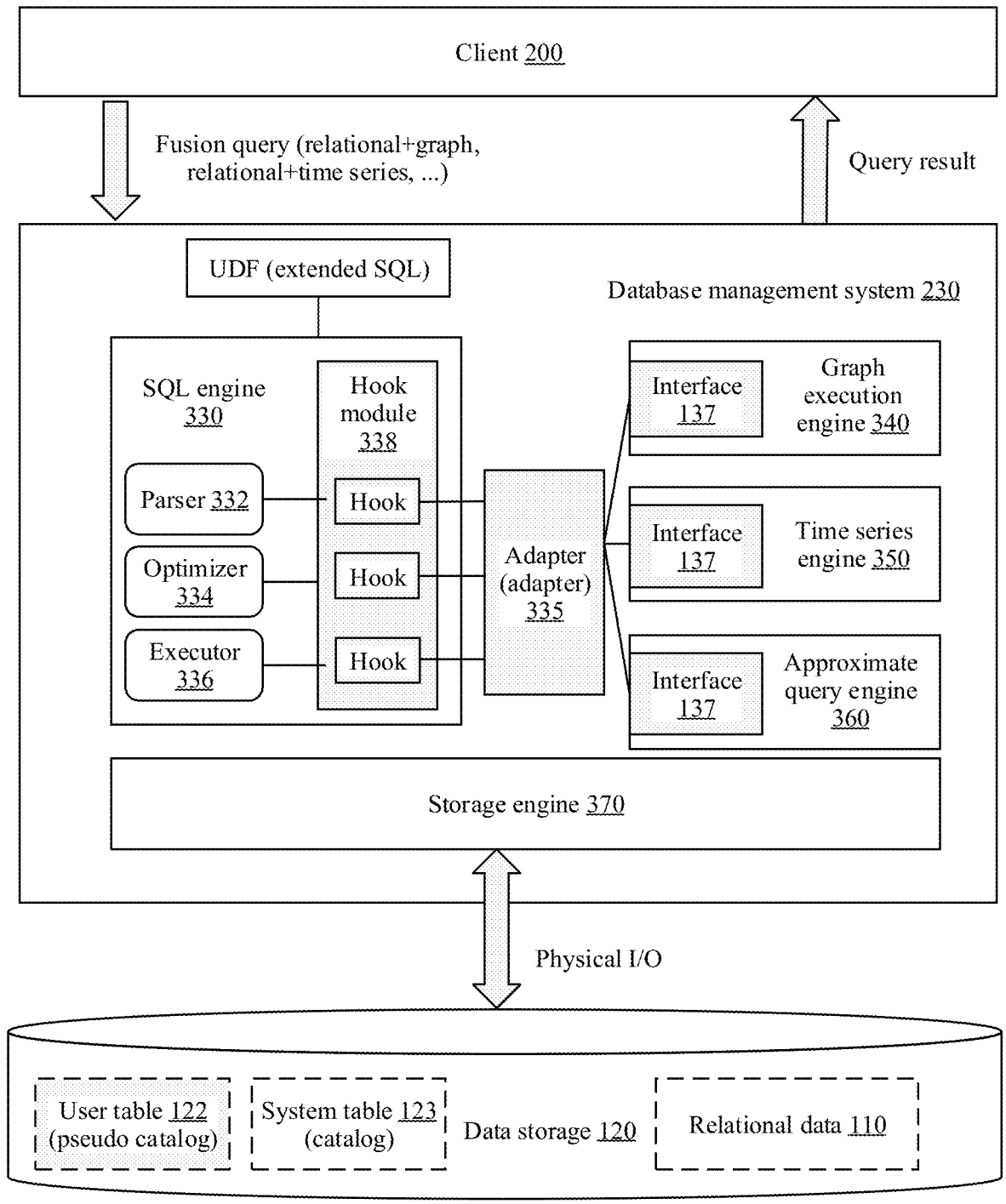
FIG. 6 is a schematic diagram of a structure of a database management system according to an embodiment of this application.

FIG. 6 shows an example of another database management system according to an embodiment of this application. According to FIG. 6, a database management system 230 includes an SQL engine 330, a graph execution engine 340, a time series engine 350, an approximate query engine 360, an adapter 335, and a storage engine 370. The database management system 230 supports a plurality of types of fusion queries, for example, a fusion query including a relational query and a graph query and a fusion query including a relational query and a time series query.

After receiving a fusion query, the SQL engine 330 identifies a specific type of query included in the fusion query, for example, a graph query or a time series query. In this embodiment of this application, another type of query, for example, a graph query or a time series query, may be extended in an SQL query by using a user-defined function (UDF). A query in a square box at an upper right corner in FIG. 5 is used as an example, and a statement of an italic part beginning with "Gremlin" may be considered as a UDF. The UDF is usually associated with a specific interface.

In an embodiment, as shown in FIG. 6, the SQL engine 330 includes a parser 332, an optimizer 334, an executor 336, and a hook module 338. The parser 332 is configured to parse an SQL query statement into a specific structure, for example, a query tree, through lexical analysis and syntax analysis. The optimizer 334 generates an optimal execution plan corresponding to a query statement according to a rule or based on a cost model. The executor 336 executes the execution plan generated by the optimizer 334, to obtain a query result.

In an embodiment, the hook module 338 includes a series of hook functions (hook), and each UDF is associated with one or more hook functions. The UDF invokes a hook function associated with the UDF, to pass information to an extensible execution engine by using the adapter 335, for example, to pass information to one of the graph execution engine 340, the time series engine 350, and the approximate query engine 360. In addition, a processing result of the extensible execution engine may also be returned to the UDF by using the adapter 335.

Figure 7:
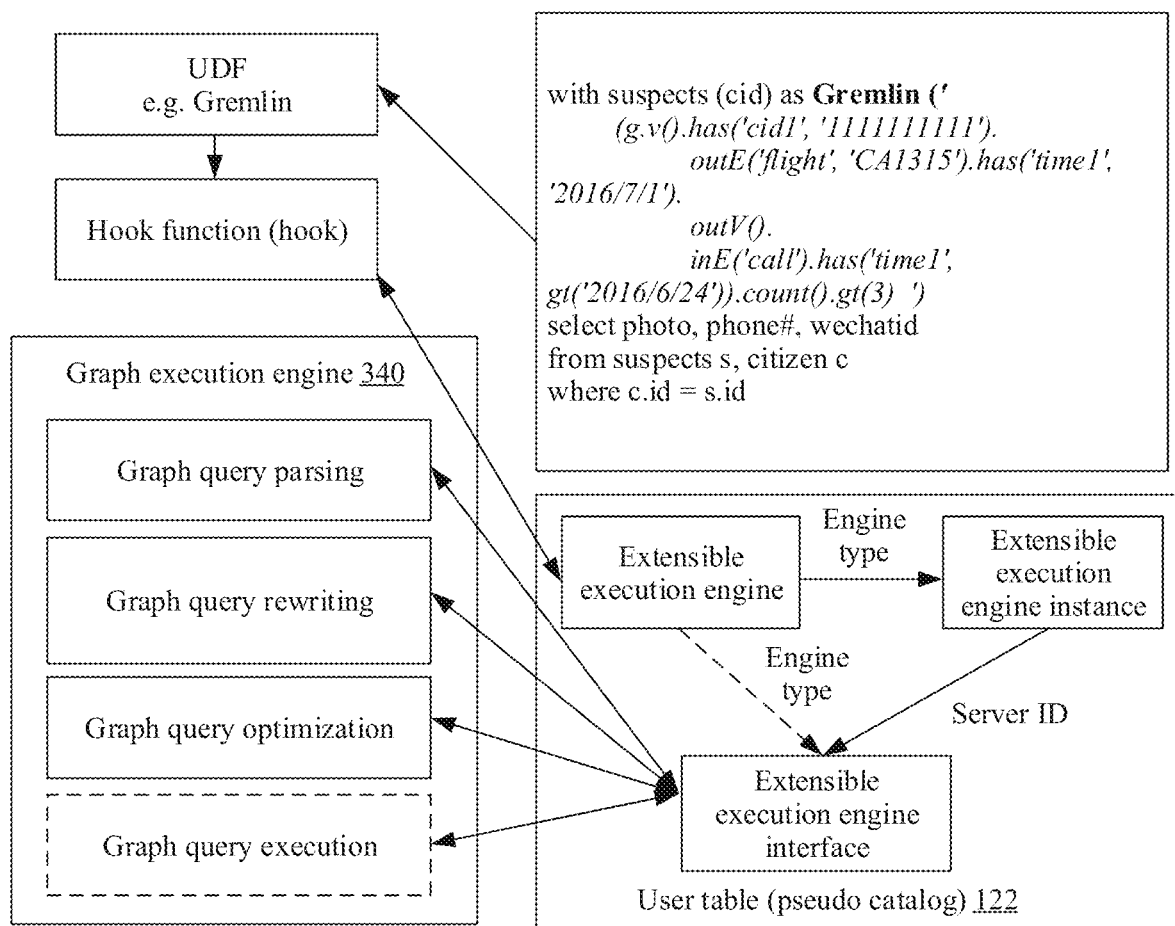
FIG. 7 is a schematic diagram of an operating process of a database management system according to an embodiment of this application.

In an embodiment, as shown in FIG. 7, it is assumed that a query initiated by a client 200 is a fusion query including a relational query and a graph query, and a UDF corresponding to the graph query invokes a hook function associated with the UDF, so that the graph query is passed to the adapter 335 by using the hook function. The adapter 335 determines, based on metadata of extensible execution engines recorded by a pseudo catalog 122, a type of an extensible execution engine configured to process the graph query, an ID of a server on which an instance of this type of extensible execution engine is located, and an interface corresponding to the instance of the extensible execution engine, and then sends, by using the interface, the graph query to the instance of the extensible execution engine for processing. The ID of the server herein includes but is not limited to an IP address and/or a port number of the server.

In an embodiment, the metadata recorded by the pseudo catalog 122 is shown in Table 1:

TABLE 1

| Name | Function |
| --- | --- |
| foreign_engine | Used to save/display information about an extensible execution engine currently supported by an MMDB system |
| foreign_engine_mapping | Used to save/display foreign engine instance information about each extensible execution engine |
| foreign_engine_wrapper | Used to save/display foreign_engine_wrapper information corresponding to each foreign engine instance |

As shown in FIG. 7, after receiving the graph query, the adapter 335 determines, based on the metadata, that foreign engines currently supported by the database management system include a graph execution engine, and then determines, based on the foreign_engine_mapping in the metadata, an instance that is of the graph execution engine and that may be used to process the graph query, for example, determines an IP address of a server on which the instance of the graph execution engine is located. Further, the adapter 335 determines foreign_engine_wrapper corresponding to the instance of the graph execution engine based on the foreign_engine_wrapper information in the metadata, that is, determines an interface and a related hook function. Finally, the adapter 335 sends, by using the determined interface, the graph query to the instance of the graph execution engine for processing, and returns an intermediate result and/or a final structure of the processing to the SQL engine 330 by using the hook function.

Figure 8:
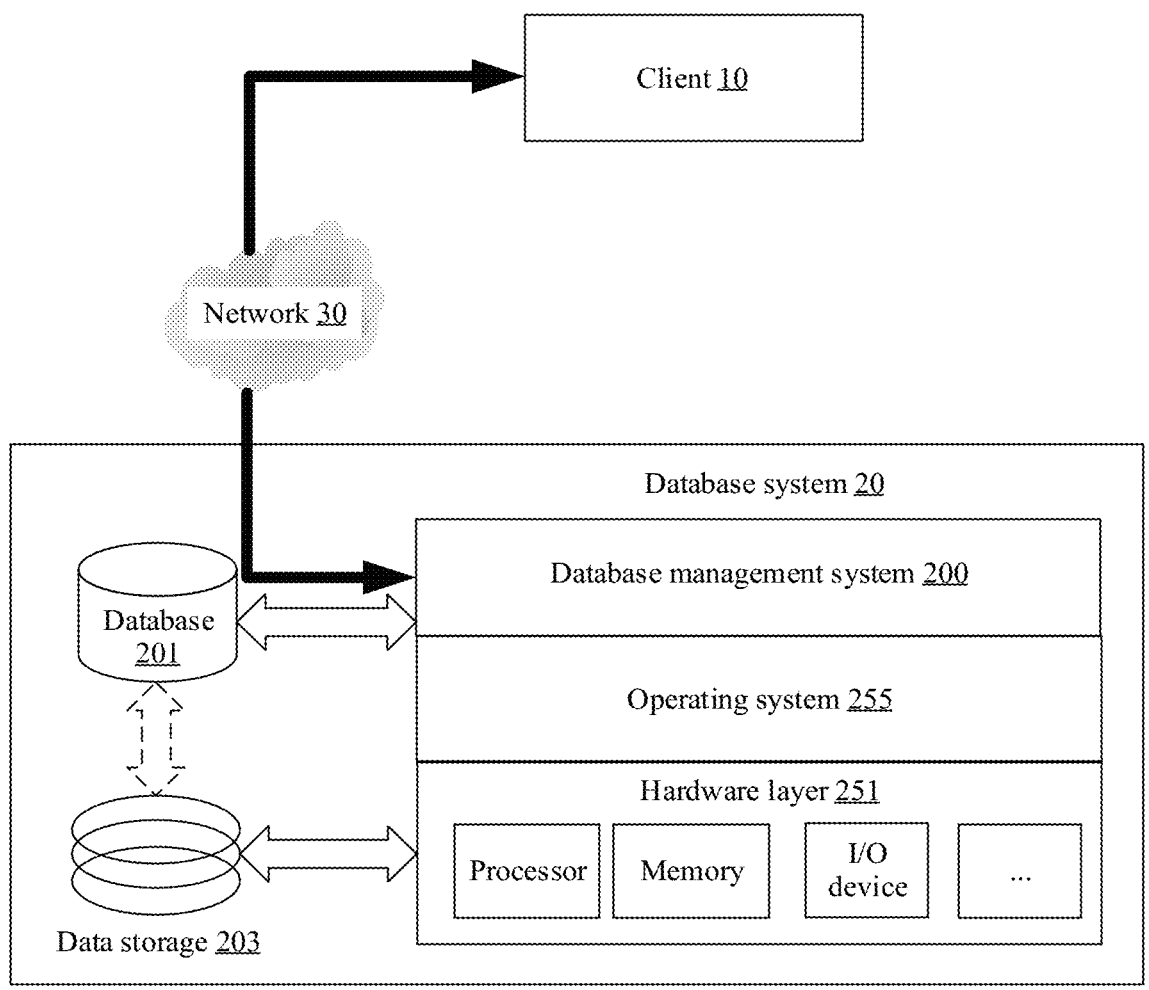
FIG. 8 is a schematic diagram of an architecture of a database system according to an embodiment of this application.

FIG. 8 shows a database system that integrates the multi-model database management system described in the foregoing embodiments according to an embodiment of this application. The database system includes a data storage 203, a database management system 200, and a database 201 stored in the data storage 203. The database 201 includes data tables organized based on a relational model.

A client 10 establishes a communication connection to the database management system 200 by using a network 30, and sends a request or query to the database management system 200, to access and/or modify the database 201 in the data storage 203 or import new data to the database 201. The database management system 200 performs a corresponding operation based on a received query to generate a query result corresponding to the query, and returns the query result to the client 10.

The client 10 includes any type of device or application configured to interact with the database management system 200. In some examples, the client 10 includes one or more application servers. The query initiated by the client 10 is described by using a specific database language. Database languages include but are not limited to: a structured query language (SQL) applicable to a relational database, a graph query language (for example, Gremlin) applicable to a graph database, a time series language applicable to a time series database, and the like. In an embodiment, the query submitted by the client 10 is a fusion query including a plurality of types of query languages, for example, a fusion query including a first type of query (for example, an SQL query) and a second type of query (for example, a graph query).

The database management system 200 may be the multi-model database management system described in the foregoing embodiments. For a specific operating process, refer to the foregoing embodiments.

Operation of the database management system 200 depends on necessary hardware and software environments, including but not limited to a hardware layer 251 and an operating system 255. The hardware layer 251 includes basic hardware units required for operation of the operating system 255 and the database management system 200, for example, a processor, a memory, an input/output (I/O) device, and a network interface controller (NIC). The operating system 255 is system software that manages the hardware units, and may provide functions such as memory management and thread scheduling.

The data storage 203 may be a non-transitory computer-readable storage medium such as a hard disk, a magnetic disk, a storage array, a storage server, a cloud storage, or a storage area network (SAN), and is communicatively connected to a computing node in which the hardware layer 251 is located. Alternatively, the data storage 203 may be integrated in the computing node in which the hardware layer 251 is located, to exchange data with the processor and the I/O device by using a bus or in another internal communication manner. It should be noted that, the "computing node" in this embodiment of this application refers to an entity that has a hardware resource required for performing data computation and/or storage, for example, a physical machine or a database server, or refers to an entity that can invoke a hardware resource for computation and/or storage, for example, a virtual machine (VM) or a container deployed in a physical machine.

In an embodiment, a function of the database management system 200 may be implemented by the processor by executing an executable program stored in a memory. It should be understood that, in the embodiments of the present invention, the "executable program" shall be widely construed as including but not limited to: instructions, an instruction set, code, a code segment, a subprogram, a software module, an application, a software package, a thread, a process, a function, firmware, middleware, and the like.

A person skilled in the art may understand that the database system may include components more or less than those shown in FIG. 8, or include components different from those shown in FIG. 8. FIG. 8 merely show components more related to implementations disclosed in the embodiments of the present invention. It should be understood that, in the embodiments of the present invention, the "executable program" shall be widely construed as including but not limited to: instructions, an instruction set, code, a code segment, a subprogram, a software module, an application, a software package, a thread, a process, a function, firmware, middleware, and the like. Sequence numbers of the foregoing method steps described in the foregoing embodiments do not mean execution sequences. The execution sequences of the processes should be determined based on functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by using hardware or a combination of computer software and hardware. Whether the functions are performed by hardware or software depends on particular applications and design constraint conditions of the technical solutions. A person skilled in the art may use different methods to implement the described functions for each specific application.

What is claimed is:

1. A multi-model database management system, comprising a main execution engine, one or more extensible execution engines, and an adapter, wherein
    the main execution engine is configured to:
        receive a fusion query from a client, wherein the fusion query comprises a first type of query and a second type of query;
        process the first type of query to obtain a first processing result; and
        pass the second type of query to the adapter by using a first interface;
    the adapter is configured to:
        determine, based on metadata of the one or more extensible execution engines, a first extensible execution engine configured to process the second type of query, and a second interface corresponding to the first extensible execution engine; and
        pass the second type of query to the first extensible execution engine by using the second interface;
    the first extensible execution engine is configured to:
        process the second type of query to obtain a second processing result; and
        return the second processing result to the main execution engine by using the adapter; and
    the main execution engine is further configured to:
        generate a query result based on the first processing result and the second processing result; and
        return the query result to the client,
    wherein the metadata comprises information about an extensible execution engine supported by the multi-model database management system, wherein the information about the extensible execution engine comprises: a type of the extensible execution engine, an address of a server on which one or more instances of the extensible execution engine are located, and interface information corresponding to the extensible execution engine.

2. The multi-model database management system according to claim 1, wherein the second type of query is defined by a user-defined function (UDF).

3. The multi-model database management system according to claim 1, wherein the first interface comprises at least one hook function; and the at least one hook function is associated with the UDF.

4. The multi-model database management system according to claim 1, wherein the metadata is stored in a user table of the multi-model database management system.

5. The multi-model database management system according to claim 1, wherein the main execution engine is a structured query language (SQL) engine, and the one or more extensible execution engines comprise at least one of a graph execution engine, a time series engine, or an approximate query engine.

6. The multi-model database management system according to claim 5, wherein the first type of query is a structured query statement, the second type of query is a graph query statement, and the first extensible execution engine is a graph execution engine.

7. A database server, comprising a processor, a memory, and a computer program that is stored in the memory and executable by the processor, wherein when the processor executes the program the processer is configured to:
receive a fusion query submitted by a client, wherein the fusion query comprises a first type of query and a second type of query;
process, by using a main execution engine, the first type of query to obtain a first processing result;
determine, based on metadata, a first extensible execution engine configured to process the second type of query, and an interface corresponding to the first extensible execution engine wherein the metadata comprises information about an extensible execution engine supported by a multi-model database management system, and the information about the extensible execution comprises a type of the extensible executing engine and an address of a server on which one or more instances of the extensible execution engine are located;
pass, by using the interface, the second type of query to the first extensible execution engine;
process, by using the first extensible execution engine, the second type of query to obtain a second processing result; and
generate a query result based on the first processing result and the second processing result, and returning the query result to the client.

8. The database server according to claim 7, wherein the second type of query is defined by a user-defined function (UDF).

9. The database server according to claim 7, wherein the information about the extensible execution engine comprises interface information corresponding to the extensible execution engine; and an adapter is specifically configured to: query the metadata to determine a first engine instance of the first extensible execution engine and an interface corresponding to the first engine instance, and pass, by using the interface corresponding to the first engine instance, the second type of query to the first engine instance for processing.

10. The database server according to claim 7, wherein the first type of query is a structured query statement, the second type of query is a graph query statement, and the first extensible execution engine is a graph execution engine.

11. A fusion query method, comprising:
receiving a fusion query submitted by a client, wherein the fusion query comprises a first type of query and a second type of query;
processing, by using a main execution engine, the first type of query to obtain a first processing result;
determining, based on metadata, a first extensible execution engine configured to process the second type of query, and an interface corresponding to the first extensible execution engine, wherein the metadata comprises information about an extensible execution engine supported by a multi-model database management system, and the information about the extensible execution engine comprises a type of the extensible execution engine and an address of a server on which one or more instances of the extensible execution engine are located;
passing, by using the interface, the second type of query to the first extensible execution engine;
processing, by using the first extensible execution engine, the second type of query to obtain a second processing result; and
generating a query result based on the first processing result and the second processing result, and returning the query result to the client.

12. The method according to claim 11, wherein the second type of query is defined by a user-defined function (UDF).

13. The method according to claim 11, wherein the information about the extensible execution engine comprises interface information corresponding to the extensible execution engine; and an adapter is specifically configured to: query the metadata to determine a first engine instance of the first extensible execution engine and an interface corresponding to the first engine instance, and pass, by using the interface corresponding to the first engine instance, the second type of query to the first engine instance for processing.

14. The method according to claim 11, wherein the first type of query is a structured query statement, the second type of query is a graph query statement, and the first extensible execution engine is a graph execution engine.

* * * * *